(12) United States Patent
Graffin

(10) Patent No.: US 6,334,471 B1
(45) Date of Patent: Jan. 1, 2002

(54) METHOD OF FILLING A RECEPTACLE

(75) Inventor: André Graffin, La Ferte Bernard (FR)

(73) Assignee: Serac Group, La Berte Bernard (FR)

( * ) Notice: Subject to any disclaimer, the term of this patent is extended or adjusted under 35 U.S.C. 154(b) by 0 days.

(21) Appl. No.: 09/610,870

(22) Filed: Jul. 6, 2000

(30) Foreign Application Priority Data

Jul. 19, 1999 (FR) .............................................. 99 09327

(51) Int. Cl.$^7$ ................................................ B65B 3/28
(52) U.S. Cl. .............................. 141/83; 141/1; 141/198
(58) Field of Search ........................... 141/1, 9, 83, 104, 141/122, 128, 192, 196, 198, 243

(56) References Cited

U.S. PATENT DOCUMENTS

| 4,526,215 | A | * | 7/1985 | Harrison et al. .............. 141/83 |
| 5,148,841 | A | | 9/1992 | Graffin |
| 5,287,896 | A | | 2/1994 | Graffin |
| 5,515,888 | A | | 5/1996 | Graffin |

FOREIGN PATENT DOCUMENTS

DE          9306625       7/1993

* cited by examiner

Primary Examiner—Timothy L. Maust
Assistant Examiner—Peter deVore

(57) ABSTRACT

A method of filling a receptacle with a net weight substance by means of a filler member disposed to introduce the substance into the receptacle while the receptacle is being carried by a force sensor, the method comprising at least one cycle comprising the steps of:

placing the receptacle on the force sensor;

commanding the filler member to start a flow of the substance;

repeatedly measuring the time for which the substance has been flowing since the start-of-flow command was issued;

measuring a value of a signal supplied by the force sensor at least at first and second separate measurement instants;

calculating a mean flow rate of the substance over the time interval between the measurement instants;

making at least one computed evaluation of a filling time on the basis of the calculated mean flow rate and a reference weight; and commanding the flow of substance to stop when the flow time of the substance is equal to the evaluated filling time.

7 Claims, 3 Drawing Sheets

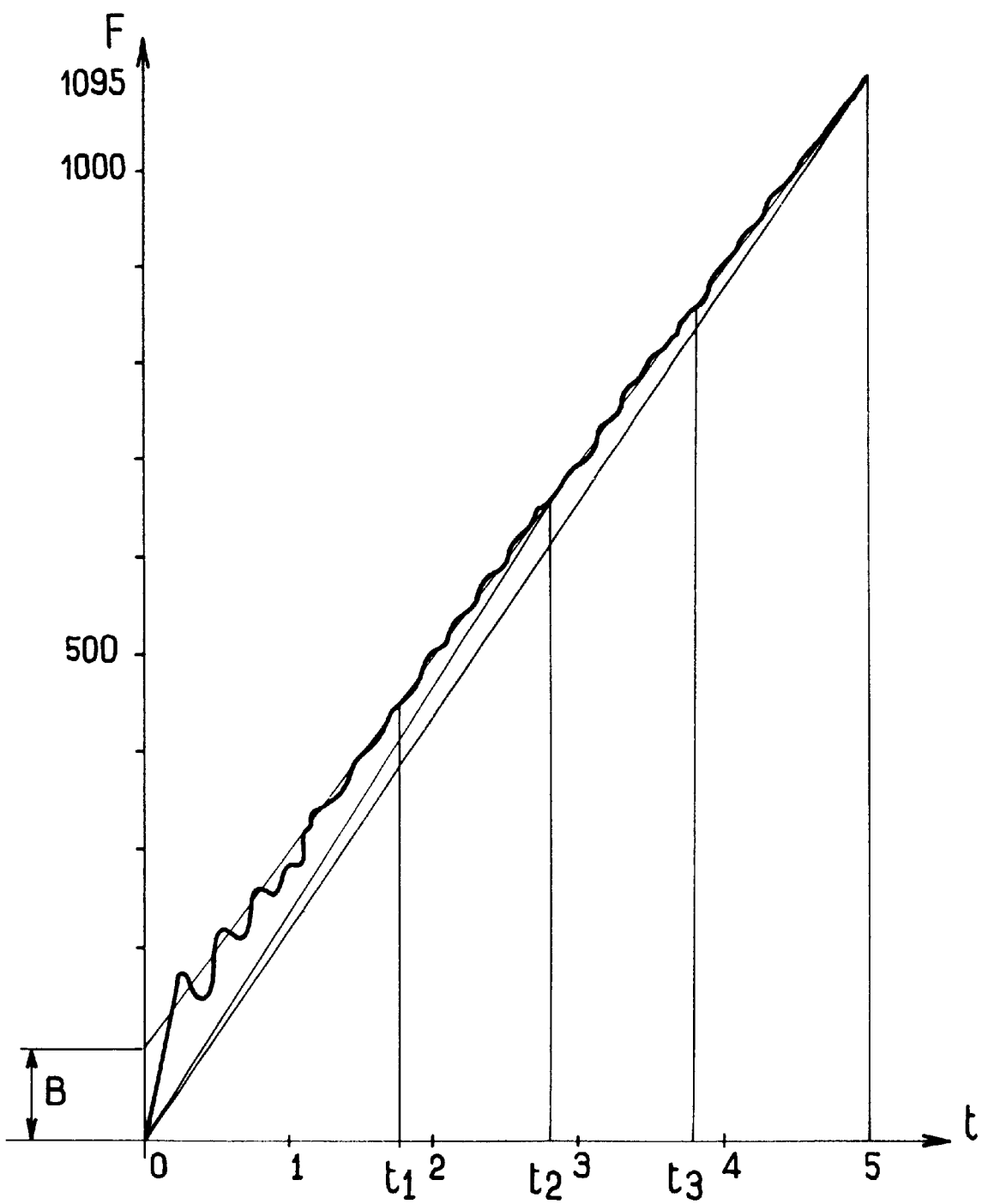
FIG_1

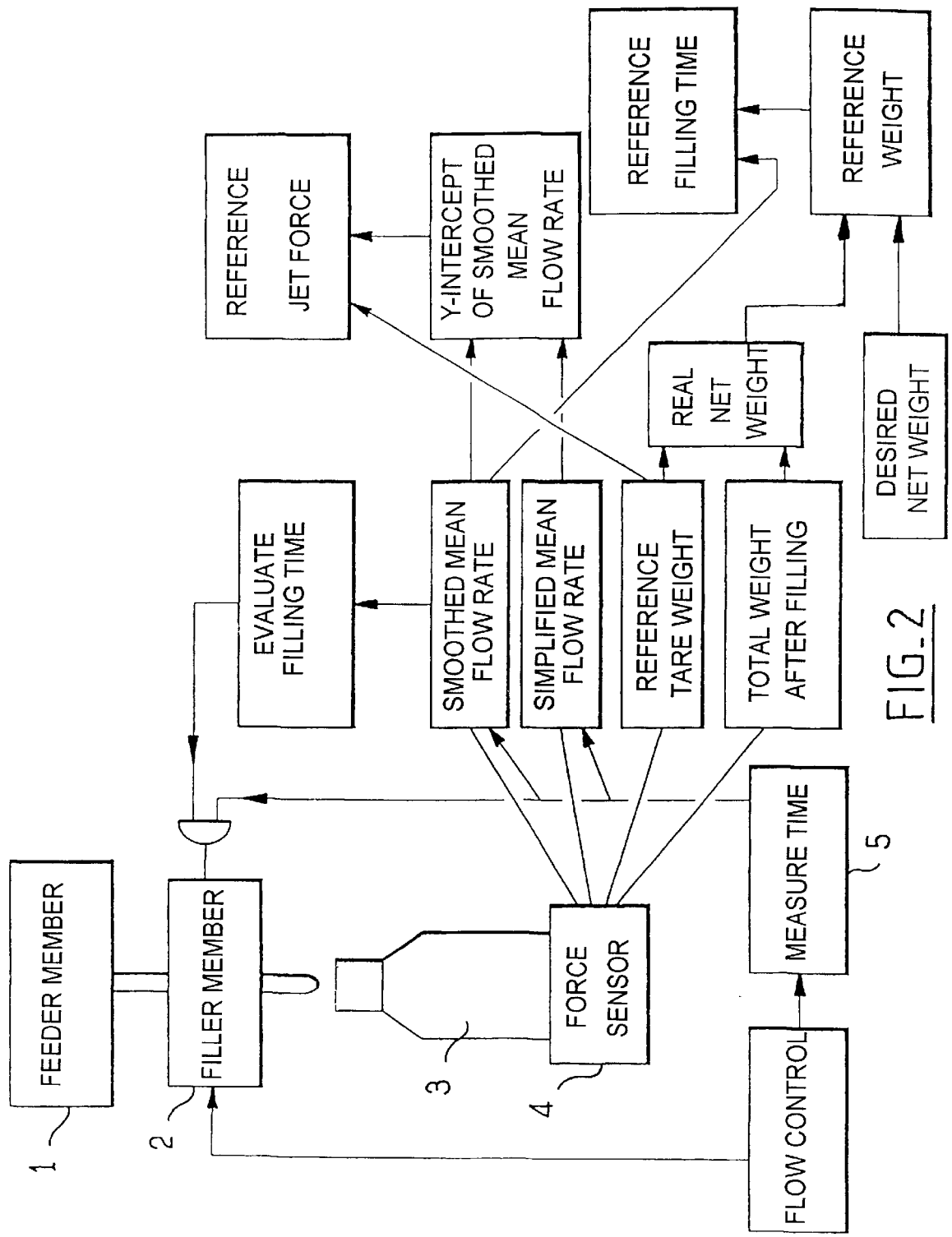
FIG_2

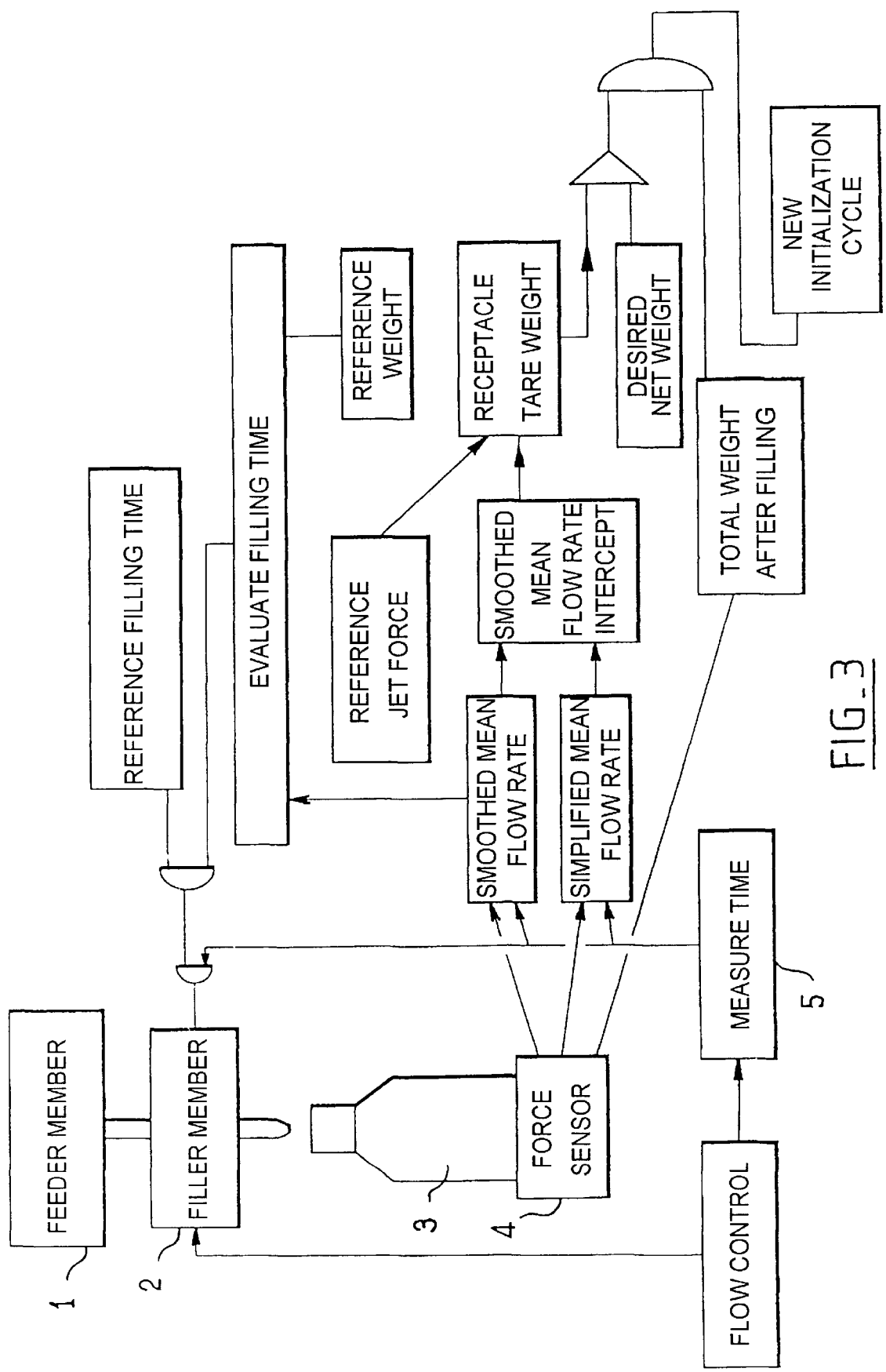
FIG_3

METHOD OF FILLING A RECEPTACLE

The present invention relates to a method of filling a receptacle with a net weight of substance by means of a filler member disposed to introduce the substance into the receptacle while the receptacle is being carried by a force sensor.

BACKGROUND OF THE INVENTION

Various methods are known for filling a receptacle with a net weight of substance. Traditionally, the simplest method consists in placing a receptacle on a weighing member, the receptacle itself being disposed beneath a filler member which can be turned on and off under the control of the weighing member as a function of the apparent weight that is measured thereby. The apparent weight comprises not only the empty or "tare" weight of the receptacle plus the net weight of the substance contained in the receptacle, but also the force that results from the jet of substance on the surface of the substance contained in the receptacle. This force varies not only as a function of how wide the filler member is open, but also as a function of the viscosity of the substance, such that if the viscosity of the substance varies during filling, the weight measurement performed by the weighing member is falsified and the real net weight of substance introduced into the receptacle at the end of filling is not equal to the desired net weight of substance.

In addition, at the moment at which the filler member is closed, the substance that extends between the filler member and the surface of the substance within the receptacle, referred to herein as the "tailing", is added to the weight of substance finally contained in the receptacle at the end of the filling cycle. The weight of the tailing varies as a function of the diameter of the orifice of the filler member immediately prior to conventional methods, the pressure of the jet during filling and the weight of the tailing therefore need to be compensated for in order to end up with the desired net weight of substance in the receptacle.

French patent 2 679 516 discloses a filling method that consists in servo-controlling the flow rate of the substance to a reference flow rate and in filling for a predetermined fixed length of time that is calculated beforehand by dividing the net weight by the reference flow rate. That method makes it possible to eliminate the effects due to the pressure of the jet on the surface of the substance contained in the receptacle by measuring the instantaneous flow rate over successive time intervals during which the force of the jet of substance on the surface of the substance contained in the receptacle is assumed to be constant. In theory, that method should be highly satisfactory, but in practice servo-controlling the flow rate on the reference flow rate does not enable a real flow rate to be obtained that is exactly equal to the reference flow rate, so it is still necessary to perform compensation by checking the real net weight after filling and modifying the parameters of the servo-control loop for subsequent filling cycles so that the real net weight comes as close as possible to the desired net weight.

French document 2 711 610 discloses a filling method comprising steps of: measuring the instantaneous flow rate of the substance introduced into the receptacle over successive time intervals; calculating the total weight of substance introduced into the receptacle on the basis of the instantaneous flow rate over each time interval; and causing the flow of the substance to stop once the total calculated weight reaches the net weight minus the weight of the tailing. That method presents the advantage of automatically taking account of variations in the instantaneous flow rate when calculating the total weight of substance contained in a receptacle, so that the real net weight of substance contained in the receptacle after the filler member has been closed is, in theory, affected only by variations in the weight of the tailing, with the influence thereof being small. Nevertheless, while the receptacle is being put onto the weighing member and while the jet of substance is establishing itself once the flow has been turned on, the weighing member is subjected to oscillations which falsify the measured instantaneous flow rate and consequently falsify the calculated total weight of substance contained in the receptacle. To mitigate that drawback, it is necessary to filter the signal from the weighing member, at least during the initial stages of filling, by using complex algorithms that significantly increase the cost of implementing that filling method.

OBJECTS AND SUMMARY OF THE INVENTION

An object of the present invention is to propose a method of filling a receptacle that can be implemented with algorithms that are simple, while nevertheless making it possible to obtain high accuracy concerning the net weight of the substance introduced into the receptacle.

In order to achieve that object, the invention provides a method of filling a receptacle with a net weight substance by means of a filler member disposed to introduce the substance into the receptacle while the receptacle is being carried by a force sensor, the method comprising at least one cycle comprising the steps of:

placing the receptacle on the force sensor;

commanding the filler member to start a flow of the substance;

repeatedly measuring the time for which the substance has been flowing since the start-of-flow command was issued;

measuring a value of a signal supplied by the force sensor at least at first and second separate measurement instants;

calculating a mean flow rate of the substance over the time interval between the measurement instants;

making at least one computed evaluation of a filling time on the basis of the calculated mean flow rate and a reference weight; and commanding the flow of substance to stop when the flow time of the substance is equal to the evaluated filling time.

Thus, the step of calculating a mean flow rate for the substance minimizes the consequence of the oscillations on starting so that an accurate result is obtained without it being necessary to use complex calculation algorithms.

In an advantageous variant of the invention, a smoothed mean flow rate is calculated by selecting measurement instants that are offset from the start-of-flow command sufficiently for the force sensor to be substantially stable over the time interval between the measurement instants. The period of instability at the beginning of the cycle is thus automatically eliminated.

In a preferred implementation of the invention, the method includes an initialization cycle comprising the steps of:

placing an initialization receptacle on the force sensor;

preferably measuring a reference tare weight of the receptacle on the force sensor means and storing the reference tare weight;

commanding the filler member to start the flow of substance;

repeatedly measuring a substance flow time from the start-of-flow command;

calculating at least once the smoothed mean flow rate of the substance;

calculating at least one evaluation of a filling time on the basis of the smoothed mean flow rate and a desired net weight of substance;

commanding the flow of substance to stop when the product flow time is equal to the evaluated filling time;

measuring the weight of the receptacle after filling and deducing therefrom a difference between the desired net weight of substance and the real net weight of substance in the receptacle; and correcting the reference weight as a function of said difference.

Thus, the initialization cycle implements steps that are substantially identical to those of the cycles that are implemented subsequently for filling other receptacles, such that the reference weight is determined at no extra cost.

BRIEF DESCRIPTION OF THE DRAWINGS

Other characteristics and advantages of the invention will appear on reading the following description of a preferred implementation of the method of the invention given with reference to the accompanying figures, in which:

FIG. 1 is a graph showing how the force measured by the force sensor varies as a function of time during a filling cycle;

FIG. 2 is a block diagram showing the filling steps during an initialization cycle in the preferred implementation of the invention; and FIG. 3 is a block diagram of the filling steps during a normal filling cycle in a preferred implementation of the invention.

MORE DETAILED DESCRIPTION

With reference to FIG. 2, the method of the invention is implemented by apparatus comprising in conventional manner a feeder member 1 connected to a filler member 2 disposed above a receptacle 3 itself carried by a force sensor 4. The feeder member is, for example, a vessel carried by the rotary platform of a carousel or a vessel separated from the carousel and connected to the platform by a pipe including a rotary joint. The flow from the feeder member can be enhanced by a centrifugal pump. By way of example, the filler member 2 is a valve or an Archimedes' screw under the control of a stepper motor, the speed of the motor determining the flow rate driven by the Archimedes' screw, particularly when the substance is a semiliquid such as mayonnaise, or is a non-uniform substance such as a sauce with lumps in it. It will be observed in this context that the filter member cannot be controlled directly on a flow rate value, but must be controlled on some other physical parameter (outlet section or speed of rotation of the screw), with the real flow rate depending not only on the controlled physical parameter, but also on other parameters such as the density of the substance, its viscosity, and the pressure in the feed duct.

The apparatus also has a member for measuring time 5 which member includes a clock for giving a common time base to the various members that serve to implement the method of the invention.

The graph of FIG. 1 shows how the force measured by the force sensor varies as a function of time while a 1-liter bottle is being filled with milk. The duration of a filling cycle is about 5 seconds, which implies an average flow rate of about 200 grams (g) per second. It will readily be understood that such a high flow rate implies a considerable amount of force from the jet. When the jet of substance is established, it therefore delivers an impact against the bottom of the receptacle, thus explaining the force oscillations measured by the force sensor during a little more than 1 second from the beginning of a cycle. It will be observed that these oscillations could be avoided if the force sensor were allowed to stabilize after a receptacle had been placed thereon and if the flow were controlled by increasing its rate smoothly so as to avoid impacting against the force sensor. Unfortunately, that solution would lengthen the duration of a filling cycle in a manner that is totally incompatible with the filling throughputs that are now being required.

In the preferred implementation of the invention, a filling method is provided that comprises firstly an initialization cycle for acquiring a certain number of parameters specific to the installation. During the initialization cycle, a receptacle 3 is placed on the force sensor 4 and the tare weight of the receptacle is measured after allowing the force sensor to stabilize. The tare weight of the receptacle as measured during the initialization cycle is stored, and it is referred to below as the reference tare weight. Flow is then triggered and time measurement is started, making it possible repeatedly to measure the length of time the substance has been flowing since the flow started, for example time is measured by counting thousandths of a second. In parallel, a force signal delivered by the force sensor is measured at separate measurement instants, e.g. once every ½50th of a second. The values of the force signal as measured in this way are used for calculating a mean flow rate of the substance during the time interval between two measurement instants.

In the preferred implementation of the invention, the mean flow rate is calculated in two different ways: firstly a smoothed mean flow rate is calculated by selecting measurement instants that are offset relative to the start-of-flow command sufficiently to ensure that the force sensor is substantially stable over the time interval between two measurement instants.

With reference to FIG. 1, the smoothed mean flow rate is therefore not calculated during the period of somewhat more than 1 second that follows the start-of-flow command, but is repeatedly calculated thereafter, e.g. between instants $t_1$, $t_2$, and $t_3$ which are deliberately shown as being widely spaced apart in FIG. 1 so as to facilitate understanding. The smoothed mean flow rate is calculated by determining the force difference between two measurement instants and by dividing it by the length of time measured between those two instants. If the force measured at instant $t_2$ is designated by $F_1$, and the force measured at instant $t_2$ by $F_2, \ldots$, then a first smoothed mean flow rate can be calculated between instants $t_1$ and $t_2$ by applying the formula:

$$D_1 = (F_2 - F_1)/(t_2 - t_1)$$

At subsequent instant $t_3$, the smoothed mean flow rate can be calculated either by taking the difference between the forces $F_2$ and $F_3$ or the difference between the forces $F_1$ and $F_3$, and then dividing said difference by the corresponding time measurement. In order to obtain better smoothing, it is also possible to calculate the smoothed mean flow rate by averaging the force as measured at various instants preceding the measurement instant and by calculating the force difference on the basis of the value measured at the last instant and the mean calculated over the preceding instants, and then dividing it by the time interval between the last reading instant and the mean of the reading instants taken into account for calculating the mean of the force differences. It is also possible to perform smoothing by taking an average over a plurality of smoothed mean flow rates. However it is done, each calculated smoothed mean flow rate is characteristic of a straight line having the equation:

$$F=D_1 \cdot t+B$$

where F is representative of a force applied to the force sensor, i.e. not only the weight of the receptacle plus the net weight of substance contained in the receptacle, but also the force delivered by the jet of substance, where $D_1$ is the smoothed mean flow rate, t is the time measured since the start-of-flow command, and B is the ordinate intercept of the straight line representative of the smoothed mean flow rate, i.e. B is representative of the tare weight T of the receptacle plus the force $F_j$ of the jet of substance. It will be observed that the force $F_j$ is not directly measurable since that would require the force sensor to react instantaneously at the moment when the, jet is established.

Furthermore, a simplified mean flow rate $D_f$ is calculated by dividing the value of the force signal at a given instant by the time that has been measured since the start-of-flow command. The simplified mean flow rate is representative of a straight line between the origin and the corresponding point on the filling curve. Each calculated simplified flow rate corresponds to a different straight line. In order to avoid overcrowding the figure, only those straight lines which represent the simplified mean flow rates at instant $t_2$ and at the end of filling are shown in FIG. 1. The equation of the straight line representing the simplified mean flow rate is:

$$F=D_f t$$

When the smoothed mean flow rate and the simplified mean flow rate are calculated for the same measurement instant, the force measured by the force sensor is the same, so it is therefore possible to calculate the ordinate intercept of the straight line representative of the smoothed flow rate from the intersection of the two straight lines, i.e.:

$$D_f t = D_1 \cdot t + B$$

from which it can be deduced:

$$B=(D_f-D_1)/t$$

During the initialization cycle, the reference tare weight $T_r$ of the receptacle is determined. It is therefore possible to calculate a reference jet force $F_{jr}$ by applying the formula:

$$F_{jr}=B_r-T_r$$

where $B_r$ is the ordinate intercept of the straight line representative of the smoothed mean flow rate during the initialization cycle.

Simultaneously with calculating the reference jet force, an evaluation of the filling time is calculated from the smoothed mean flow rate by dividing the net weight of substance that is to be introduced into the receptacle by the calculated smoothed mean flow rate. The time measured since the start-of-flow command is periodically compared with the filling time as calculated in this way, and the flow is stopped when the time during which the substance has flowed is equal to the evaluated filling time.

It will be observed that because the filling curve is assumed to be a straight line, and because the weight of the tailing is not taken into account when turning off the flow, the real net weight of substance contained in the receptacle at the end of the initialization cycle cannot be equal to the desired net weight.

According to a characteristic of the invention, during the initialization cycle, the total weight is measured after filling and a real net weight is calculated by subtracting the reference tare weight T as previously stored, with the force sensor then being used as a weighing machine. A reference weight $P_r$ is then calculated by subtracting from the desired net weight the difference between the real net weight and the desired net weight. It is also possible on the basis of the reference weight $P_r$ to calculate a reference filling time $t_r$ by diving the reference weight by the smoothed mean flow rate during the initialization cycle.

With reference to FIG. 3, the invention makes use of the parameters of the initialization cycle for the subsequent receptacle-filling cycles. During each filling cycle, a receptacle is placed on the force sensor, but unlike the initialization cycle, the filler member issues a command to cause the substance to flow immediately without it being necessary to wait for the force sensor to stabilize after the receptacle has been put into place. The start-of-flow command can even be issued early relative to the receptacle being introduced onto the force sensor so that spite of the filler member lagging by a response time, the jet of substance reaches the receptacle at the very moment it is put into place on the force sensor, thereby enabling the filling throughput rate to be increased. As during the initialization cycle, the smoothed mean flow rate and the simplified mean flow rate are calculated repeatedly at different measurement instants, thereby making it possible on each occasion to determine the ordinate intercept of the straight line representative of the smoothed mean flow rate, as in the initialization cycle.

The calculated value for this ordinate intercept and the force of the reference jet as previously stored are now used to estimate the tare weight T of the receptacle that is being filled by applying the following formula:

$$T=B-F_{jr}$$

The tare weight of the receptacle as obtained in this way can be used to monitor the net weight, as described below.

Thereafter, filling time is evaluated by dividing the latest calculated reference weight by the latest calculated smoothed mean flow rate.

A command for stopping the flow of substance as measured by the time measuring member 5 is equal to the estimated filling time.

In the preferred implementation shown in FIG. 3, after each evaluation of the filling time, a comparison is made between the calculated filling time and the reference filling time as calculated at the end of the initialization cycle, and if the difference exceeds a critical value, e.g. 5' of the reference filling time, then the flow is stopped using the reference filling time. and a new initialization cycle is performed in order to update the parameters of the installation.

If the filling cycle time is short enough compared with the desired throughput, then verification is preferably performed at the end of each filling cycle. Verification consists in measuring the weight of the full receptacle, in comparing the measured weight with an estimated weight equal to the sum of the estimated tare weight plus the desired net weight of substance. When this verification discloses a difference between the measured weight and the estimated weight that exceeds a critical value, then a new initialization cycle is performed. This verification can also be used without replacing the calculated evaluation of the filling time by the reference filling time when the evaluated filling time differs abnormally from the reference filling time.

Naturally, the invention is not limited to the implementation described and can be varied without going beyond the ambient of the invention as defined by the claims.

In particular, although installation parameters are described as being acquired by performing an initialization cycle, provision can be made to obtain these parameters either by calculation, or by performing measurements independently of implementing the filling method of the invention. For example, when the receptacles are of constant tare weight from one receptacle to another, then the step of measuring the tare weight of a receptacle in an initialization cycle can be omitted, as can the step of estimating the tare weight of the receptacle in each of the subsequent filling cycles.

When the parameters of the installation are highly constant, or when the constraints on filling accuracy are less severe, it is also possible to simplify the method of the invention by evaluating filling time on the basis of a single calculation of the mean flow rate, performed, for example, about 4 seconds after issuing the start-of-flow command.

In addition, it will be observed in FIG. 1 that because of the steep slope of the filling curve in its substantially rectilinear portion and because of the small offset of the ordinate intercept, the straight line representative of the simplified mean flow rate is very close to the real filling curve, in particular at the end of filling. Without going beyond the ambient of the invention, it is thus possible to estimate filling time by replacing the smoothed mean flow rate with the simplified mean flow rate and making a correction either on the basis of measurements performed during an initialization cycle, or by calculating corrections.

When performing a comparison between the evaluated filling time and a reference filling time, provision can be made to update the reference filling time by replacing the initial reference falling time with the latest reference filling time evaluated when the difference does not exceed the critical value. It is also possible to provide a second critical threshold for which an alarm is immediately triggered when the difference between the evaluated filling time and the reference filling time exceeds said second threshold.

What is claimed is:

1. A method of filling a receptacle with a net weight substance by means of a filler member disposed to introduce the substance into the receptacle while the receptacle is being carried by a force sensor, the method comprising at least one cycle comprising the steps of:
   placing the receptacle on the force sensor;
   commanding the filler member to start a flow of the substance;
   repeatedly measuring the time for which the substance has been flowing since the start-of-flow command was issued;
   measuring a value of a signal supplied by the force sensor at least at first and second separate measurement instants;
   calculating a mean flow rate of the substance over the time interval between the measurement instants;
   making at least one computed evaluation of a filling time on the basis of the calculated mean flow rate and a reference weight; and
   commanding the flow of substance to stop when the flow time of the substance is equal to the evaluated filling time.

2. A method according to claim 1, wherein a smoothed mean flow rate is calculated by selecting measurement instants that are offset from the start-to-flow command sufficiently for the force sensor to be substantially stable over the time interval between the measurement instants.

3. A method according to claim 2, including an initialization cycle comprising the steps of:
   placing a receptacle on the force sensor;
   commanding the filler member to start the flow of substance;
   repeatedly measuring a substance flow time from the start-of-flow command;
   calculating at least once the smoothed mean flow rate of the substance;
   calculating at least one evaluation of a filling time on the basis of the smoothed mean flow rate and a desired net weight of substance;
   commanding the flow of substance to stop when the product flow time is equal to the evaluated filling time;
   measuring the weight of the receptacle after filling and deducing therefrom a difference between the desired net weight of substance and the real net weight of substance in the receptacle; and
   calculating the reference weight by subtracting the difference between the desired net weight and the real net weight from the desired net weight.

4. A method according to claim 3, including a prior step of measuring a reference tare weight of the receptacle by means of the force sensor, and storing the reference tare weight.

5. A method according to claim 3, including, during the initialization cycle, the steps of:
   calculating at least once a simplified mean flow rate between the start-of-flow command and a latest measurement instant;
   calculating the difference between the simplified mean flow rate and the smoothed mean flow rate by reference to a reference tare weight of the receptacle; and
   deducing therefrom a reference jet force of the product and storing it;
   and including, during each subsequent cycle, the steps of:
   calculating at least once the simplified mean flow rate; and
   calculating the difference between the simplified mean flow rate and the smoothed mean flow rate with reference to the reference jet force and estimating an tare weight for the receptacle that is being filled.

6. A method according to claim 5, including the steps of measuring the weight of the receptacle, comparing the measured weight with an estimated weight equal to the sum of the estimated tare weight plus the desired net weight of substance, and triggering a new initialization cycle whenever the difference between the measured weight and the estimated weight exceeds a critical value.

7. A method according to claim 6, including, during the initialization cycle and after correcting the reference weight, the steps of evaluating a reference filling time and of storing it, and including, during each subsequent cycle, the steps of comparing the evaluated filling time for the receptacle being filled with the reference filling time and of comparing the measured weight and the estimated weight when a difference between the estimated filling time and the reference filling time exceeds a critical value.

* * * * *